(12) United States Patent
Okada et al.

(10) Patent No.: US 8,165,454 B2
(45) Date of Patent: Apr. 24, 2012

(54) RECORDING CONTROL APPARATUS, RECORDING CONTROL METHOD AND RECORDING APPARATUS INTEGRAL WITH CAMERA

(75) Inventors: Shunji Okada, Kanagawa (JP); Katsumi Matsuno, Kanagawa (JP)

(73) Assignee: Sony Corporation (JP)

( * ) Notice: Subject to any disclaimer, the term of this patent is extended or adjusted under 35 U.S.C. 154(b) by 1699 days.

(21) Appl. No.: 11/480,043

(22) Filed: Jun. 30, 2006

(65) Prior Publication Data

US 2007/0162688 A1  Jul. 12, 2007

(30) Foreign Application Priority Data

Jul. 1, 2005  (JP) ................ P2005-194263

(51) Int. Cl.
*G11B 27/00* (2006.01)
*H04N 5/93* (2006.01)
(52) U.S. Cl. .... 386/278; 711/103; 386/286; 386/E5.072
(58) Field of Classification Search .................. 386/379, 386/278, 289, E5.072; 711/103
See application file for complete search history.

(56) References Cited

U.S. PATENT DOCUMENTS

| 6,020,982 | A | 2/2000 | Yamauchi et al. | |
|---|---|---|---|---|
| 2003/0026186 | A1 | 2/2003 | Ando et al. | |
| 2003/0182297 | A1* | 9/2003 | Murakami et al. | 707/100 |
| 2005/0031297 | A1* | 2/2005 | Kaise et al. | 386/46 |
| 2006/0209196 | A1* | 9/2006 | Ohtsuka et al. | 348/231.99 |

FOREIGN PATENT DOCUMENTS

| EP | 1 152 428 A2 | 11/2001 |
|---|---|---|
| JP | 11-242563 A | 9/1999 |
| JP | 2002-229829 A | 8/2002 |
| JP | 2003114817 A | 4/2003 |
| JP | 2004-71130 A | 3/2004 |
| JP | 2004343682 A | 12/2004 |
| JP | 2005110054 A | 4/2005 |
| WO | WO 2004090889 A1 * | 10/2004 |

OTHER PUBLICATIONS

Kim, H.J. et al., "A New Flash Memory Management for Flash Storage System" Proceedings of the 23rd Annual International Computer Software and Applications Conference., Phoenix, AZ, Oct 27-29, 1999, pp. 284-289.
Office Action from Japanese Application No. 2005-194263, dated Feb. 23, 2010.

* cited by examiner

*Primary Examiner* — Thai Tran
*Assistant Examiner* — Girumsew Wendmagegn
(74) *Attorney, Agent, or Firm* — Lerner, David, Littenberg, Krumholz & Mentlik, LLP

(57) ABSTRACT

The present invention efficiently executes a transfer process from a flash memory to an optical disc. A recording control apparatus includes a UDF file system section that configures a UDF file system on the flash file system of a flash memory and an application format section that converts video and audio data into a file group conforming to the DVD application format and manages it on the UDF file system. When copying the data recorded in the flash memory to a DVD, a management information switching section of the apparatus converts the logical addresses of the flash memory into the logical addresses of the DVD. A DVD buffer control section converts the data recorded in an array of 64 Kbytes that is the recording unit of the flash memory into an array of 32 Kbytes that is the recording unit of the DVD and transfers them to the DVD drive.

5 Claims, 13 Drawing Sheets

RECORDING CONTROL APPARATUS, RECORDING CONTROL METHOD AND RECORDING APPARATUS INTEGRAL WITH CAMERA

CROSS-REFERENCE TO RELATED APPLICATIONS

The present application claims priority from Japanese Patent Application No. JP 2005-194263 filed on Jul. 1, 2005, the disclosure of which is hereby incorporated by reference herein.

BACKGROUND OF THE INVENTION

This invention relates to a recording control apparatus and a recording control method for controlling the data to be recorded in a rewritable non-volatile memory and also to a recording apparatus integral with a camera that utilizes a rewritable non-volatile memory as auxiliary recording apparatus.

Rewritable non-volatile memories or flash memories are well known as recording mediums. Flash memories have a characteristic that the contents thereof are not erased if power supply is stopped and they can be integrated to provide a high memory capacity. Additionally, since flash memories are small and lightweight, they can suitably be used as auxiliary recording apparatus of portable type electronic appliances. Techniques are known to exploit the advantages of flash memories so as to preserve only the management data of an optical disc recording apparatus in a flash memory and make the optical disc completely accessible (see, inter alia, Jpn. Pat. Appln. Laid-Open Publication No. 11-242563).

Large capacity flash memories have been developed in recent years to raise the data transfer rate to a level several times as high as the standard bit rate of optical discs. It is also technically possible to record a large volume of data in a flash memory for the purpose of storing movies and still images.

Meanwhile, flash memories are accompanied by problems including that they can be degraded when a part thereof is used intensively and that they are not fully bit-alterable and hence it is not possible to write new data unless the existing data are erased. Flash memories are equipped with a dedicated file system that is referred to as flash file system in order to dissolve the above identified problems. With a flash file system, a flash memory is divided into a plurality of erase blocks and erasures are uniformly distributed among the erase blocks in order to avoid a situation where written data are not concentrated in particular erase blocks while operations of garbage collection are conducted to dispose unnecessary data accumulated in erase blocks. It takes about a second in average and ten seconds in the worst case per block for such an erasing process.

Since a flash memory is small and lightweight and yet has a large capacity, it can be carried with ease. However, since a long time is necessary for erasing processes, it is difficult to record the stream data obtained by picking up a moving image by means of a video camera in a flash memory.

On the other hand, images picked up by video cameras are more often than stored on optical discs such as DVDs. However, the recording unit of flash memories is larger than an EEC block that is the recording unit of optical discs and hence the conversion processing time is long for the application format and the file system of an optical disc designed on the basis of the ECC block.

Besides, if picked up images are stored on a DVD of near future that are expected to employ a holographic disc structure, for example, a disc showing a recording density 8 times higher than the recording density of currently available DVDS, the recording unit of a flash memory is smaller than the write unit of a recording page showing the 8 times higher recording density and hence the write conversion processing time of the application format and the file system from a DVD to a high density disc is longer if the write conversion is conducted on the assumption of high density recording using a recording page writing unit of a recording density eight times higher than that of an ECC block of a DVD with the standard recording density.

In view of the above-identified circumstances, it is desirable to provide a recording control apparatus and a recording control method for efficiently executing the recording process of a flash memory and the transfer process of data recorded in a flash memory to an optical disc along with a recording apparatus integral with a camera using a flash memory as auxiliary recording device.

SUMMARY OF THE INVENTION

According to an embodiment of the present invention, there is provided a recording control apparatus including a non-volatile memory file system section for managing addresses of a rewritable non-volatile memory and erasing unnecessary data remaining in the rewritable non-volatile memory; an optical disc file system section for configuring a file system for an optical disc; an application format section for generating a file group containing a set of video stream data of at least a reproduction access minimum unit conforming to the application format of optical discs on the optical disc file system; a buffer for temporarily storing data; a non-volatile memory buffer control section for converting a file group stored in the buffer into recording units of rewritable non-volatile memory; and a recording control section for causing the file group converted into the recording units of rewritable non-volatile memory to be recorded in a data recording region of the non-volatile memory.

According to an embodiment of the present invention, there is also provided a recording apparatus integral with a camera, the apparatus including a non-volatile memory file system section for managing addresses of a rewritable non-volatile memory and erasing unnecessary data remaining in the rewritable non-volatile memory; an optical disc file system section for configuring a file system for an optical disc; an image pickup means for picking up an image; an application format section for generating a file group containing a set of video stream data of at least a reproduction access minimum unit conforming to the application format of optical discs from video data of a picked up image; a buffer for temporarily storing data; a non-volatile memory buffer control section for converting a file group stored in the buffer into recording units of rewritable non-volatile memory; and a recording control section for causing the optical disc file system section and the file group converted into the recording units of rewritable non-volatile memory to be recorded in a data recording region of the non-volatile memory.

According to an embodiment of the present invention, there is also provided a recording control method including configuring a file system for an optical disc; generating a file group conforming to the application format of optical discs on the file system; storing the file group in a buffer; converting the file group stored in the buffer into recording units of non-volatile memory; and recording the file group converted into the recording units of non-volatile memory in a non-volatile memory.

Thus, according to the present invention, an optical disc file system is configured on the data recording region of a flash memory to make it is possible to transfer the data recorded on the flash memory to an optical disc without rewriting the file system of the optical disc.

Additionally, according to the present invention, a file group conforming to the standard of optical discs is generated to make it possible to record data recorded in a flash memory on an optical disc simply by rewriting the management information of the file group.

DETAILED DESCRIPTION

The preferred embodiments of the invention will be described below in terms of recording and reproducing file groups conforming to the standard of optical discs including reproduction stream file groups and management information file groups for an optical disc showing a recording density of n times of 2 of that of a flash memory and a DVD.

Figure 1:
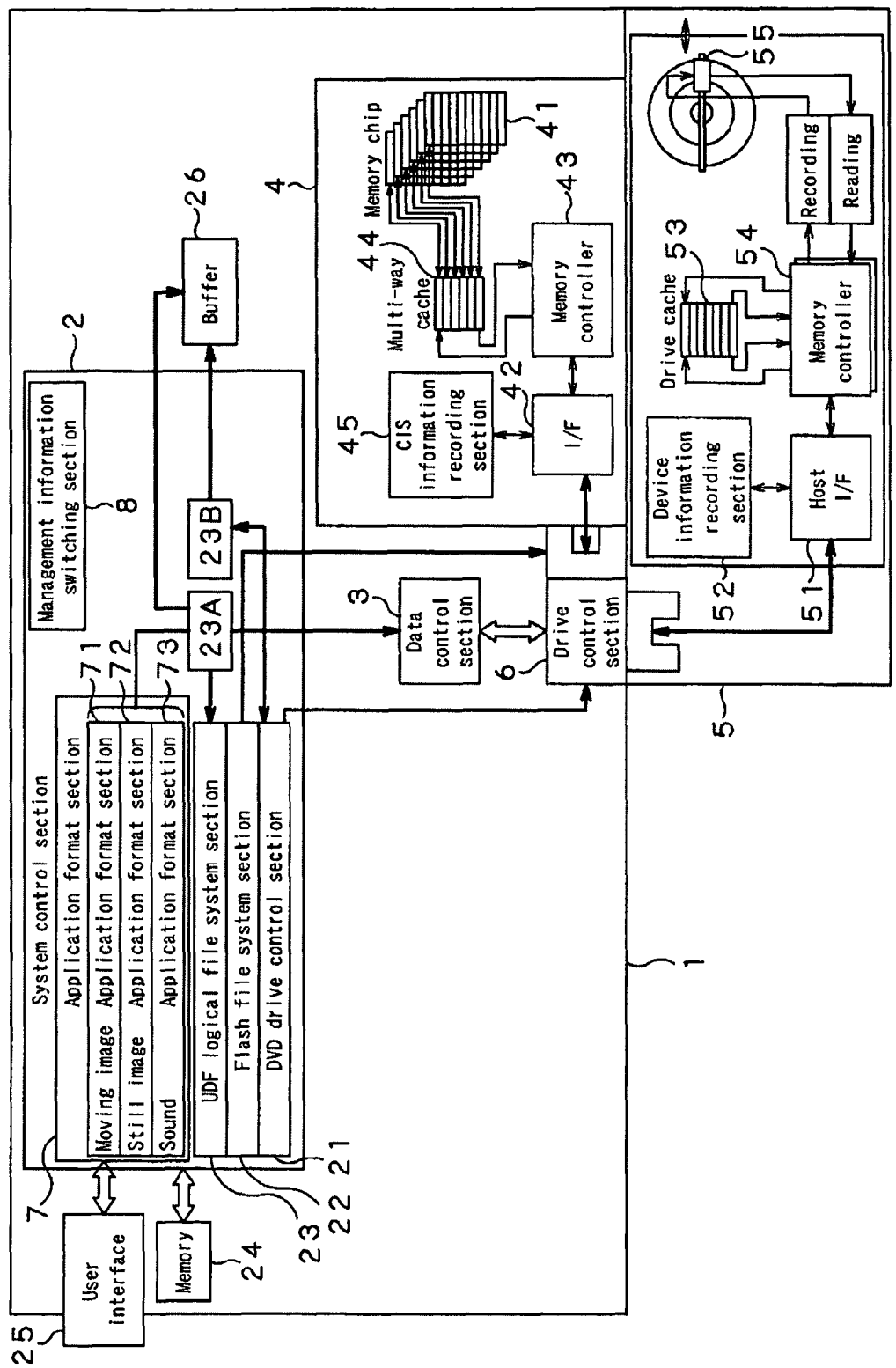
FIG. 1 is a schematic block diagram showing a configuration of recording control apparatus according to an embodiment of the present invention.

Firstly, an embodiment of recording control apparatus 1 will be described below by referring to the accompanying drawings. FIG. 1 is a schematic block diagram of the recording control apparatus 1 according to the embodiment of the present invention. The recording control apparatus 1 is adapted to record data in a flash memory 4 and copy the data recorded in the flash memory 4 to a DVD.

As shown in FIG. 1, the recording control apparatus 1 includes a system control section 2 for managing the file system of the flash memory 4, a data control section 3 for managing the flow of data in the file system and a drive control section 6 for connecting devices including the flash memory 4 and a DVD drive 5 to the system control section 2.

The system control section 2 by turn includes a DVD drive control section 21 for controlling recording and reproduction operations of the DVD drive, a flash file system section 22, a UDF (universal disc format) logical file system 23, a flash buffer control section 23A for converting the data stored in the buffer 26 into an array of 64 Kbytes, which are recording units of the flash memory 4, a DVD buffer control section 23B for converting the data of an array of 64 Kbytes read out from the buffer memory 4 into the buffer 26 into an array of 32 Kbytes of a DVD, an application format section 7 and a management information switching section 8.

The DVD drive control section 21 is a device driver of the DVD drive 5. The DVD drive control section 21 typically conforms to the ATA (AT attachment) Standard and transmits commands to a host interface 51 that also conforms to the ATA Standard through the drive control section 6. Device information recording section 52 stores identification information of the DVD driver such as the model number thereof. Drive cache 53 is a temporary data recording region. Memory controller 43 controls the optical pickup to record the data accumulated in the drive cache 53 on the DVD. The minimum recording unit of the DVD is referred to as an ECC (error correcting code) block, which is 32 Kbytes.

As shown in FIG. 1, the flash memory 4 is connected to the memory controller 43 by way of an interface 42. CIS (card information structure) information recording section 45 records the data format, the partition arrangement, vender information, device information and so on of the flash memory 4. The memory controller 43 writes the data accumulated in multi-way cache 44 in memory chip 41. The memory chip 41 is an IC (integrated circuit) chip for recording data. The memory chip 41 does not have a physical characteristic of being not fully bit-alternative so that, while it can switch a data recorded as 1 to 0, it is not able to switch a data recorded as 0 to 1. Thus, when recording data in the flash memory 4, 1s are arranged for all the data and only the necessary 1s are switched to 0s. The process of arranging 1s for all the data is referred to as erase process. The unit of erasing data is referred to as erase block. An erase block is 64 Kbytes which is twice of the number of bytes of an ECC block. A recording control apparatus 1 according to the embodiment of the present invention is records data that are managed by means of a UDF file system by units of erase blocks, each of which is a recording unit larger than an ECC block.

The flash file system section 22 is a file system realized by taking the physical characteristics of the flash memory 4 into consideration. The major processing operations that the flash file system section 22 performs are those of managing the addresses of the flash memory 4, collecting garbage and averaging the numbers of times of erasures, of which operations of collecting garbage and averaging the numbers of times of erasures are those to be performed by taking the physical characteristics of the flash memory 4 into consideration.

Firstly, the operation of averaging the numbers of times of erasures will be described below. The performance of the memory chip 41 is degraded as the flash memory 4 repeats the operation of erasing data. To avoid such degradation of performance, the flash file system section 22 records the number of times of erasing data in the corresponding erase block so that erase blocks having a fewer number of erasures may be processed with priority. With this arrangement, the numbers of times of erasures of erase blocks are averaged.

Now, the operation of collecting garbage will be described below. Since the flash memory 4 is not fully bit-alternative and hence data are not allowed to be overwritten. Therefore, to update data, the updating data are written at positions different from the positions of the data to be updated. The recorded old data that are to be updated are left there without being erased. The left data are referred to as garbage or unnecessary data. As the operation of updating data is repeated, erase blocks can become full of unnecessary data.

The flash file system section 22 performs an operation of disposing the unnecessary data accumulated in the erase blocks. This process is referred to as garbage collection. For garbage collection, firstly a particular erase block that is referred to as spare block is prepared and effective data are copied in the spare block. Then, the logical address of the spare block and the logical address of the original erase block are exchanged with each other. As a result, the spare block contains only effective data. Finally, the flash file system section 22 erases the data recorded in the original erase block that is no longer necessary. It takes 1 second in average and 10 seconds maximally for the operation of erasing the data in an erase block. Thus, the operation of erasing erase blocks can be a deterrent factor to the efforts for raising the rate at which recording processes proceed.

The recording control apparatus 1 according to the embodiment of the present invention is designed to reduce the number of times of erasures of an erase block and the time necessary for erasing an erase block by selecting an array of 64 Kbytes as data recording unit that is same as the number of bytes of an erase block. Additionally, the recording control apparatus 1 according to the embodiment of the present invention is designed to synchronize the process of accumulating data and that of erasing the unnecessary data left in an erase block. With this arrangement, it is possible to execute time consuming processes concurrently and reduce the time necessary for recording data in the flash memory 4.

Figure 2:
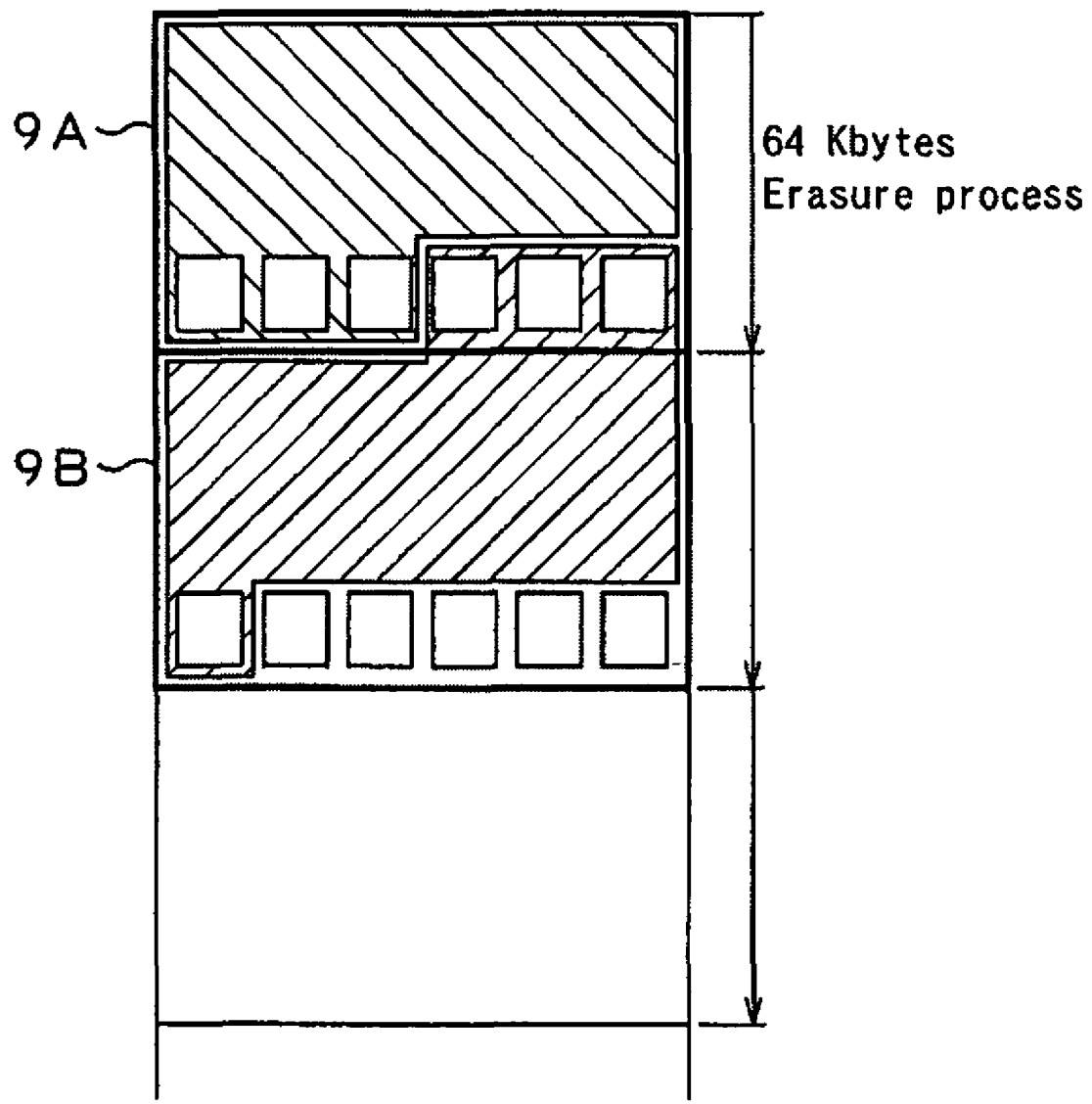
FIG. 2 is a schematic conceptual illustration showing how a recording process is efficiently executed by buffer control.

Referring now to FIG. 2, the reason why the efficiency of the process of recording data in the flash memory 4 can be improved by recording data in the flash memory 4 on an erase block by erase block basis. FIG. 2 shows two erase blocks 9A, 9B arranged one on the other. The efficiency of the data reading operation is improved by writing the data in the order of the logical block addresses when recording stream data such as moving image data and/or sound data.

Since the erase blocks 9A, 9B have 64 Kbytes, the number of bytes of a new writing address (NWA), which is the next address where are to be written, increases by 64 Kbytes when data are written continuously in the order of the logical block addresses.

If data are written in the flash memory 4 by using 32 Kbytes as recording unit as in the case of ECC blocks, the new writing address NWA is excluded from the array of 64 Kbytes with a probability of ½ so as to form an array of 32 Kbytes. As the flash file system section 22 detects that the erase block 9A does not have any array of 64 Kbytes, it records the data recorded on the erase block 9A in the other erase block 9B and subsequently writes the next ECC block to produce an array of 64 Kbytes.

Then, the flash file system section 22 spares (switches) the logical addresses of the erase block 9A having an array of 32 Kbytes and the logical addresses of the erase block 9B having an array of 64 K bytes. Since unnecessary data remain in the erase block 9A having an array of 32 Kbytes, it is necessary to execute a process of erasing the remaining unnecessary data. Then, the recording process is delayed because it takes seconds to erase the erase block 9A.

Inversely stated, it is not necessary to erase the unnecessary data remaining in the erase blocks 9A, 9B and the efficiency of recording data in the flash memory 4 is improved when data are written in the flash memory 4 by using 64 Kbytes as recording unit like the erase blocks 9A, 9B.

For the purpose of this embodiment, a process of switching recording units is referred to as a buffer control process. The flash buffer control section 23A executes a process of converting the data accumulated into the buffer 26 into an array of 64 Kbytes. A recording unit buffer control process functioning section, which is a process functioning section for the UDF file system, switches the recording unit to the recording unit of the flash memory 4, which has a size equal to twice of 32 Kbytes or an ECC of a DVD in this embodiment, to control the recording unit data for a write/read process of the flash memory 4.

Figure 3:
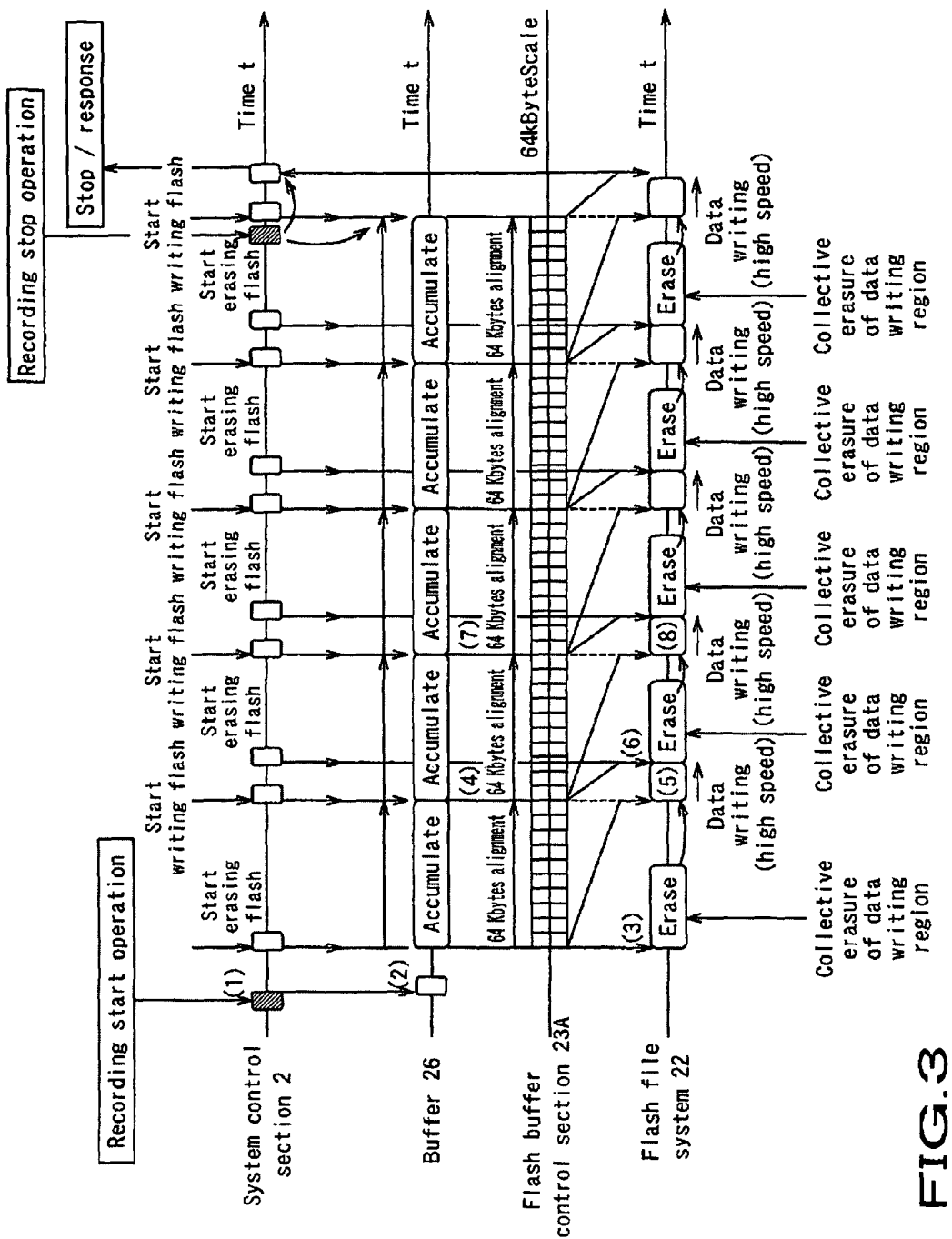
FIG. 3 is a timing chart of the operation of a recording process of a flash memory.

Now, the sequence of synchronizing the process of accumulating stream data in the buffer 26 and the erasing/recording process of an erase block will be described below by referring to FIG. 3. The system control section 2 executes this synchronization control process. Here, the process of erasing unnecessary data in the address where data are to be recorded, which is an indispensable process for the flash memory 4 to record data, is used as the starting point for accumulating stream data in the buffer 26 for the purpose of recording. Then, the process of erasing the data from the range of addresses where data are to be recorded in the flash memory 4 is finished concurrently by the time when the process of accumulating stream data is completed. In this way, the sequence and the timings of the recording process are made to be very efficient.

It is assumed here, as an example, about 20 mega bytes of data are accumulated in the buffer 26 at a time. Therefore, the unnecessary data of the flash memory cells of a range of addresses that correspond to this volume of data has to be erased before a recording process.

The time necessary for fully accumulating stream data in the buffer 26 is about 15 to 16 seconds in a standard image quality SP mode (stream rate: less than 10.08 Mbps) for MPEG 2 (Moving Picture Experts Group Phase 2) audiovisual streams. On the other hand, the time necessary for erasing unnecessary data of a cell in a range of addresses where data are to be recorded in the flash memory 4 is about 1 second in average and about 10 seconds in the worst case of specification.

An unnecessary data erasing process at a range of addresses of the flash memory 4 is completed in a time period shorter than the time necessary for completing a process of accumulating stream data in the buffer 26 by issuing flash cell erase commands collectively for the addresses where data are to be erased in the flash memory 4. With this arrangement, video data streams of high quality images are recorded continuously in the flash memory 4 without delay.

As the system control section 2 receives a signal from the user interface 25 indicating the start of a recording operation (1), it accumulates the input stream data in the buffer 26 (2). Then, the system control section 2 directs the flash file system section 22 to start a garbage collection process. In response to the directions from the system control section 2, the flash file system section 22 erase an erase block (3). The flash buffer control section 23A converts the data accumulated in the buffer 26 to an array of 64 Kbytes (4). As the data accumulated in the buffer 26 are converted to an array of 64 Kbytes, the system control section 2 controls the flash file system section 2 so as to have it record the data accumulated in the buffer 26 in the flash memory 4 (5). When the operation of recording the data is finished, the system control section 2 directs the flash file system section 22 to erase the erase block (6). During this time, the system control section 2 monitors the buffer 26 from the background and, as the flash buffer control section 23A converts the data into an array of 64 Kbytes (7), it directs the flash file system section 22 to record the accumulated data in the flash memory 4 (8). Thereafter, the flash buffer control section 23A repeats the processing steps (4) through (8).

In this way, the recording control apparatus 1 according to the embodiment of the present invention synchronizes a process of accumulating data and a process of erasing the unnecessary data remaining in an erase block. With this arrangement, it is possible to execute time consuming processes concurrently and reduce the time necessary for recording data in the flash memory 4.

Figure 4:
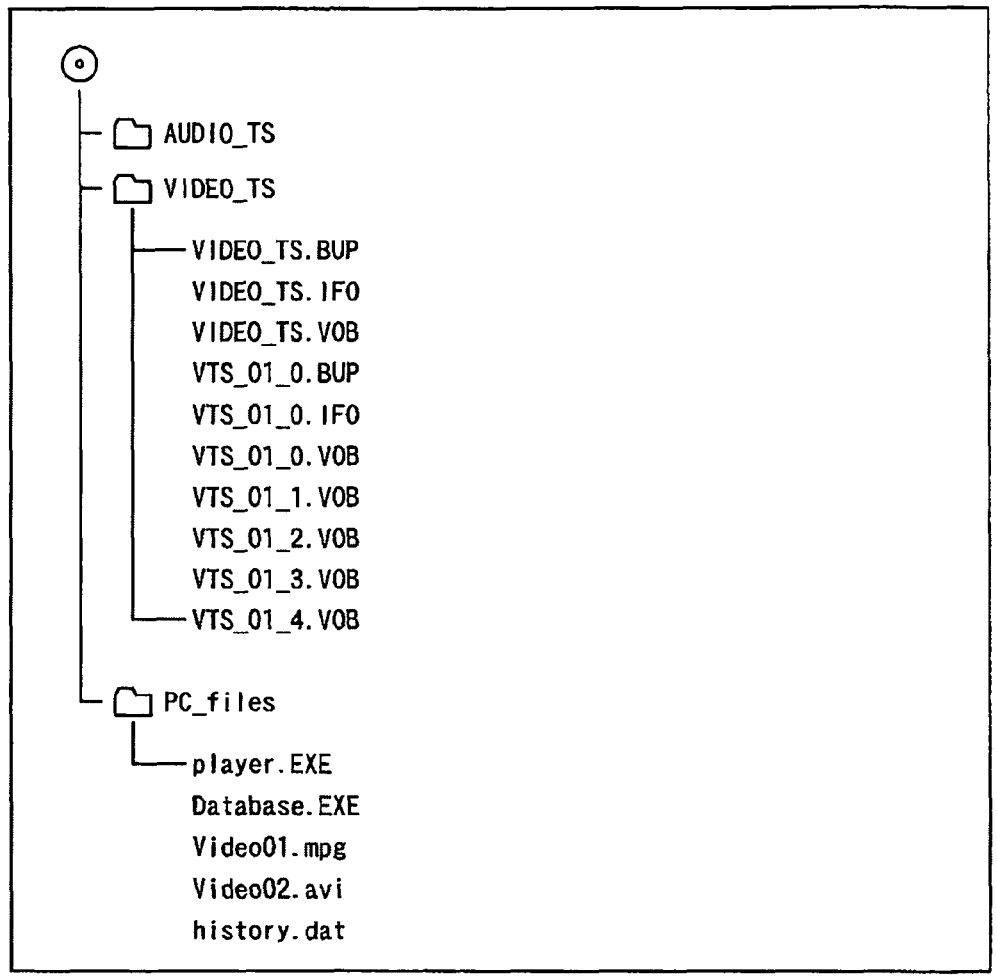
FIG. 4 is a schematic illustration of an image that can be displayed for managing files for a UDF file system.

The UDF logical file system section 23 configures a UDF file system on the flash memory 4. FIG. 4 is a schematic illustration of an image that can be displayed for managing files for a UDF file system. A UDF file system is a file system having a directory tree structure. In the instance of FIG. 4, three directories are generated in the layer immediately under a root directory.

As shown in FIG. 1, the application format section 7 includes a moving image application format section 71, a still image application format section 72 and an audio application format section 73.

A moving image HD (high density: high image quality) application format section may be arranged in the application format section 7. However, since the format for storing high image quality video data on a DVD is not defined yet at this stage, such a moving HD application format section will not be described here.

The moving image application format section 71 receives moving image data that are compressed according to MPEG Standards as input, converts the input data into a file group conforming to the DVD Video application format and stores the file group in "VIDEO_TS".

The file group conforming to the DVD Video application format includes management files having identifiers to which ".IF0" is affixed and data storage files having identifiers to which ".VOB" is affixed. The files are managed on the UDF file system.

Figure 5:
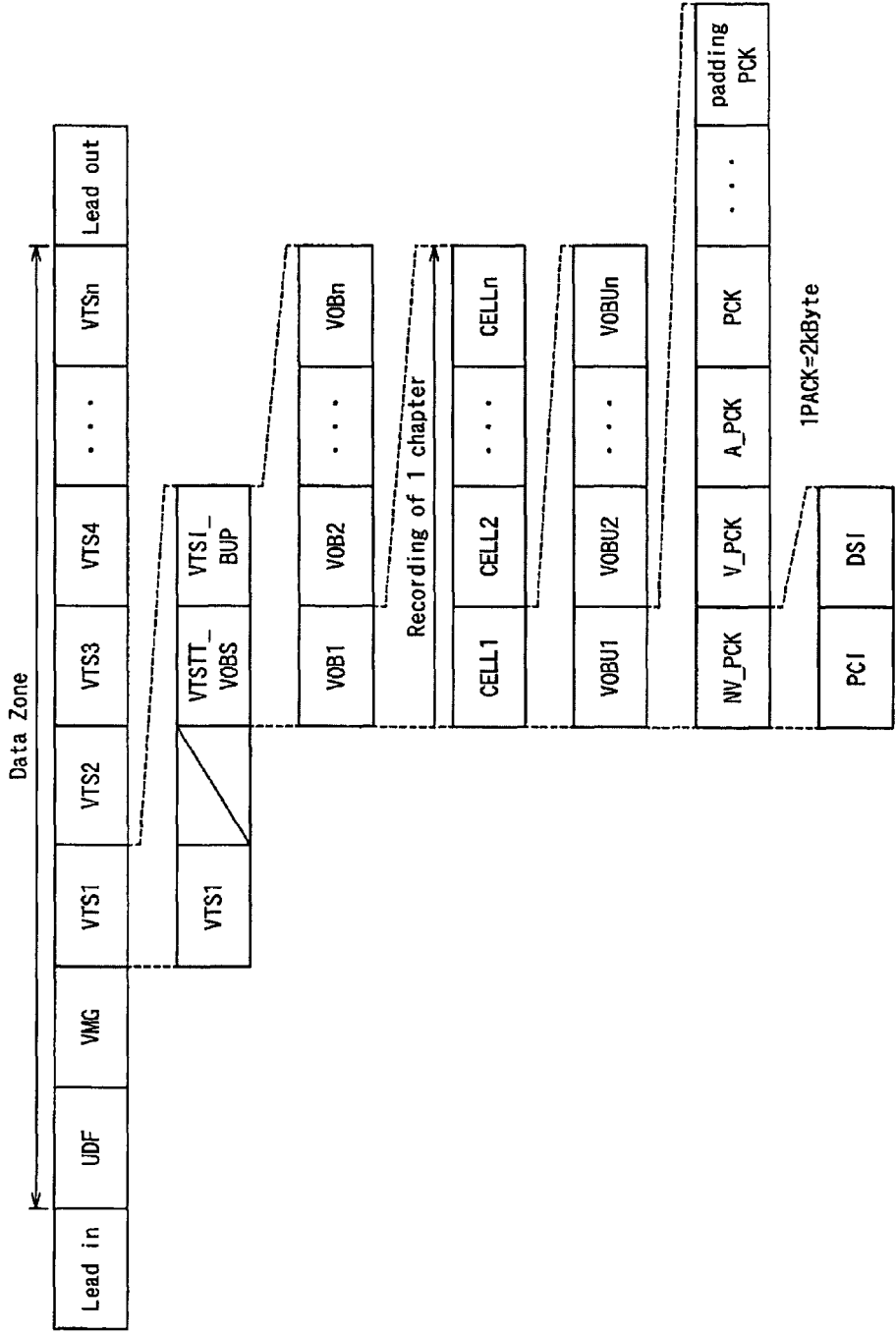
FIG. 5 is a schematic conceptual illustration of the data structure of DVD Video.

FIG. 5 is a schematic conceptual illustration of the data structure of DVDVideo. Referring to FIG. 5, the UDF file system is recorded in the shaded leading part and management information on the entire disc is recorded in the part of VMG. The data of a title are stored in each VTS1through VTSn. A VTS is formed by VTSI and VTSTT_VOBS. Management information of each VTS is written in the VTSI thereof and the image itself is stored in VSTT_VOBS.

VSTT_VOBS is a set of VOBs. A VOB is formed by 255 or less CELLs. Each CELL is formed by a VOBU. The size of a VOBU depends on the reproduction time. The reproduction time of each VOBU is 0.4 to 1.0 seconds. In this embodiment, a VOBU is as formed by a GOP (0.5 seconds). The reproduction time of the last VOBU is exceptionally equal to 1.2 seconds.

A VOBU is formed by NV_PCK, V_PCK, A_PCK and S_PCK. NV_PCK is formed by PCI that stores management information relating to reproduction display and DSI that stores management information relating to access. V_PCK stores MPEG video data and A_PCK stores MPEG audio data, while S_PCK stores MPEG sub-picture data. Moving image reproduction clock time management information is affixed to NV_PCK, V_PCK, A_PCK and S_PCK so that an image, a sound and a sub-picture may be reproduced in a synchronized manner. Each of NV_PCK, V_PCK, A_PCK and S_PCK that constitute a VOBU has a capacity of 2 Kbytes.

The files of the file system are prepared by the moving image application format section 71. Now, the process of generating a file group of the moving image application format section 71 will be described below.

The moving image application format section 71 firstly prepares V_PCK, A_PCK and S_PCK. The moving image application format section 71 receives MPEG compressed moving image data as input and multiplexes and separates the input MPEG compressed moving image data into MPEG video data, MPEG audio data and MPEG sub-picture data. Then, it stores these sets of data respectively in V_PCK, A_PCK and S_PCK, each having a capacity of 2 Kbytes. Then, the moving image application format section 71 updates VOBU_TBL each time it generates such packets. VOBU_TBL stores management information on packets.

The moving image application format section 71 generates NV_PCK or RDI_PCK from VOBU_TBL and affixes the NV_PCK it generates to the head of V_PCK, A_PCK and S_PCK to generate a VOBU.

Additionally, the moving image application format section 71 generates a CELL by collectively using VOBUS. The moving image application section updates VTS_TBL each time a CELL is generated. VTS_TBL forms a PGC (program chain).

A specific ID is affixed to each CELL. The PGC is used to specify the order in which the CELL is reproduced. A program can be defined as CELLs having continuous serial numbers in a PCG. A VOB can be defined as one or more than one programs having continuous serial numbers in a PCG. A VOB corresponds to a chapter. A chapter is an access unit for the user. The user can direct each chapter to start/stop.

The moving image application format section 71 generates a file for storing a VOBU by collecting a plurality of VOBs. In FIG. 4, the file titled as "VTS01*.VOB" (* representing a numeral) is the file for storing a VOBU.

The moving image application format section 71 prepares VTSI that contains VTS_TBL and also a file for storing VTSI. In the instance of FIG. 4, "VTS_01_0.IFO" is the file for storing VTSI. The moving image application format section 71 finally generates a file for storing VMG that contains the entire management information. In the instance of FIG. 4, VIDEO_TS.IFO is the file for storing VMG.

Figure 6:
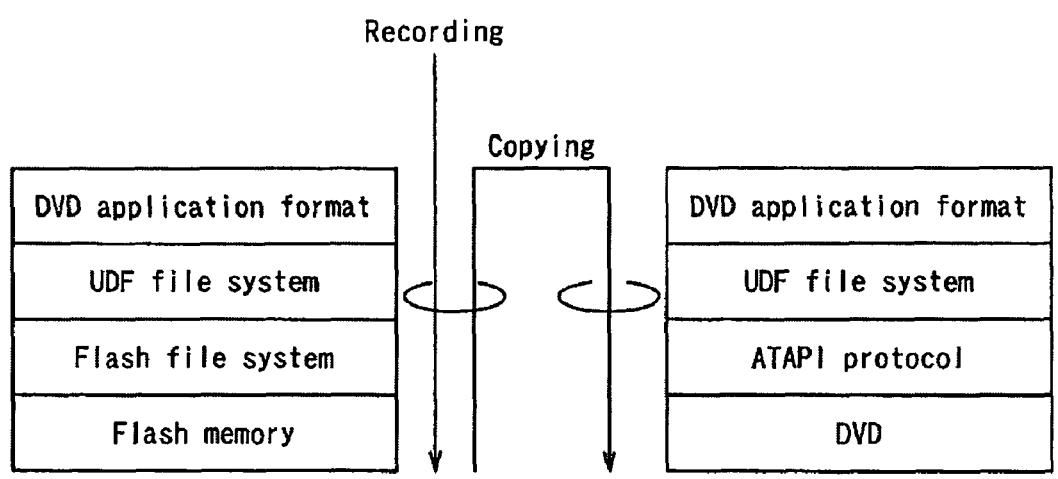
FIG. 6 is a schematic conceptual illustration of the file system structure of a DVD and a flash memory.

The recording control apparatus 1 according to the embodiment of the present invention manages the flash memory 4 by means of a file system having a structure of three layers as shown in FIG. 6. Physical layer that is located closest to the flash memory 4 is managed by a flash file system and the UDF file system that is arranged in the middle layer hierarchically manages files. The DVD application format that is arranged in the upper layer generates the files of each application such as those of moving images and sounds.

On the other hand, a DVD is managed by a file system having a structure of three layers as shown in FIG. 6. The layer that is located closest to the DVD is managed by ATAPI protocol and the middle layer is managed by the UDF file system. The DVD application format that is arranged in the upper layer generates the files of each application such as those of moving images and sounds. The ATAPI protocol is an interface protocol relative to the system control section 2.

Of the file system having a structure of three layers, the UDF file system of the middle layer and the DVD application format of the upper layer are same as those of the file system that is being used in existing DVDS. The recording control apparatus 1 improves the affinity between the flash memory 4 and the DVD by configuring a UDF file system on the flash memory 4. Since UDF file systems are being used in other optical discs such as CD-ROMS, the affinity for such optical discs is also improved.

As the affinity between the flash memory 4 and the DVD is improved, the speed of execution of a process of copying data from the flash memory 4 to the DVD is raised. Now, a process of copying data from the flash memory 4 to the DVD will be described below by referring to FIG. 7.

Figure 7:
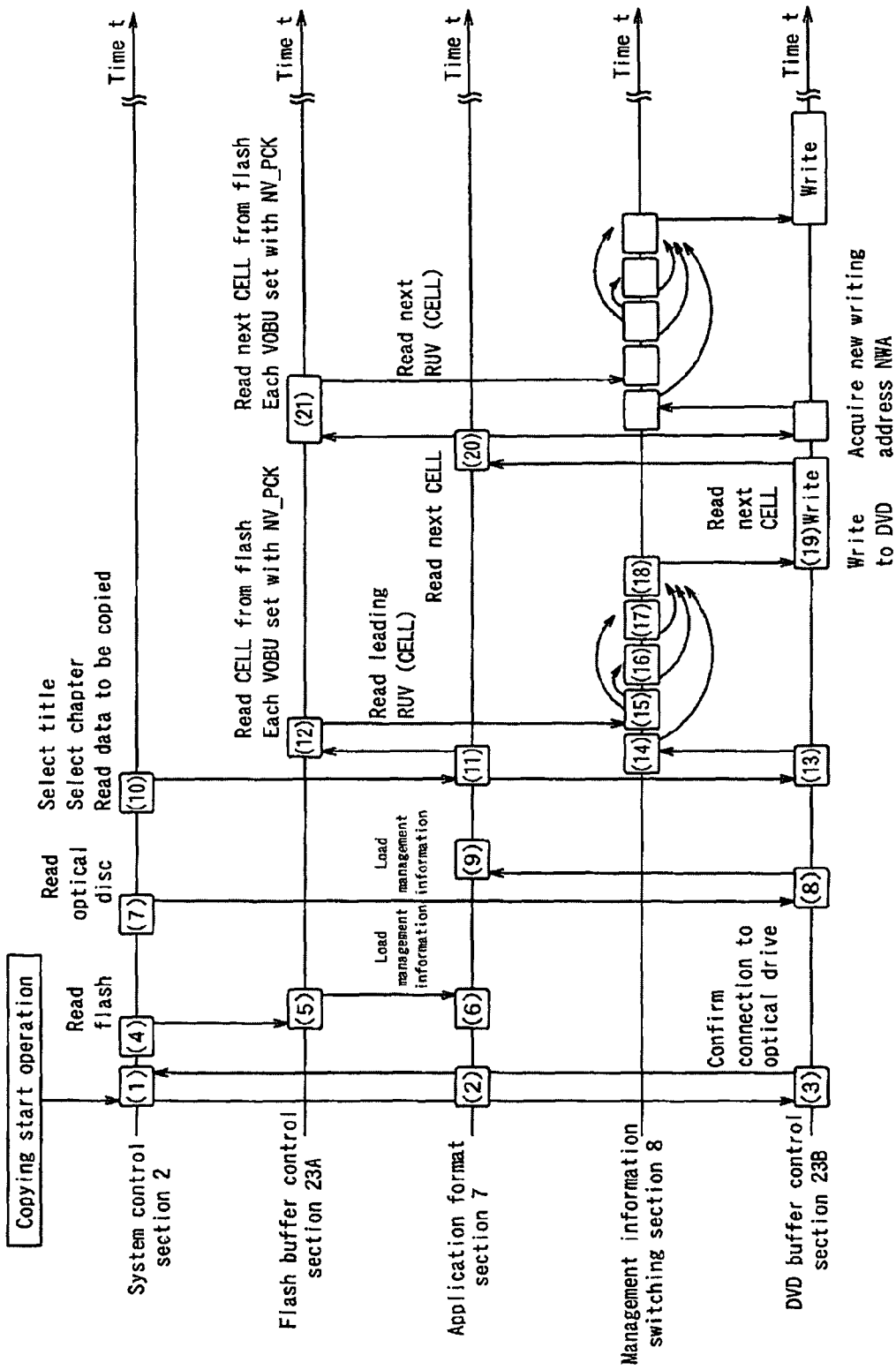
FIG. 7 is a timing chart of a copying process of copying data from a flash memory to a DVD.

FIG. 7 is a timing chart of the related blocks in the operation of a copying process from the flash memory 4 to the DVD. In FIG. 7, the operations of the system control section 2, the flash buffer control section 23A, the application format section, the management information switching section 8 and the DVD buffer control section 23B are sequentially illustrated in the described order from above.

As the system control section 2 receives a command for starting a copying process from the user interface 25 as input (1), it connects itself to the DVD drive 5 by way of the application format section 7 and the DVD buffer control section 23B (2, 3). The system control section 2 reads the management information in the flash memory 4 (4). The flash buffer control section 23A and the application format section 7 load the management information in the flash memory 4 in them (5, 6). The flash file system can be used by the flash buffer control section 23A when the management information is loaded in the latter. Then, the system control section 2 reads the management information of the DVD driver (7). The DVD buffer control section 23B and the application format section 7 load the management information of the DVD driver in them (8, 9). They can access the DVD drive 5 when management information of the DVD driver is loaded in them.

As the user specifies the title or the chapter he or she wants to copy (10), the system control section 2 transfers the title or the chapter specified by the user to the application format section 7 (11). The application format section 7 identifies the logical address of the file system where the specified title or chapter is recorded and transfers it to the flash buffer control section 23A. The flash buffer control section 23A reads out the CELLs of the title or the chapter to be copied from the flash memory 4 to the memory 24 (12). On the other hand, the DVD buffer control section 23B acquires the new writing address NWA of the DVD (13) and transfers it to the management information switching section 8 (14).

The management information switching section 8 reads in the RUV (CELL) that is the leading CELL (15). The management information switching section 8 develops VOBUs that is a component of the CELL from the CELL. Then, the management information switching section 8 extracts NV_PCK, or the management information of a VOBU, from each VOBU and restores VOBU_TBL (17).

The VOBU_TBL corresponds to the address information of the flash memory 4. Therefore, the management information switching section 8 prepares VOBU_TBL that corresponds to the new writing address NWA of the DVD on the basis of the NWA. Then, the management information switching section 8 generates NV_PCK from the newly prepared VOBU_TBL and affixes the generated NV_PCK to the VOBU. As a result, the CELL is completed for the DVD (18).

The DVD buffer control section 23B generates an ECC block of 32 Kbytes by combining packets of CELLS. When the number of bytes of the combined packets does not get to 32 Kbytes, a padding packet is added to the tail end of the ECC block (19).

As RUV (CELL), that is the leading CELL, is recorded on the DVD by the DVD buffer control section 23B, the application format section 7 identifies the logical address of the next CELL and transfers it to the flash buffer control section 23A (20). Thereafter, the system control section 2 repeats the steps (11) through (19) to write all the CELLs on the DVD.

Figure 8:
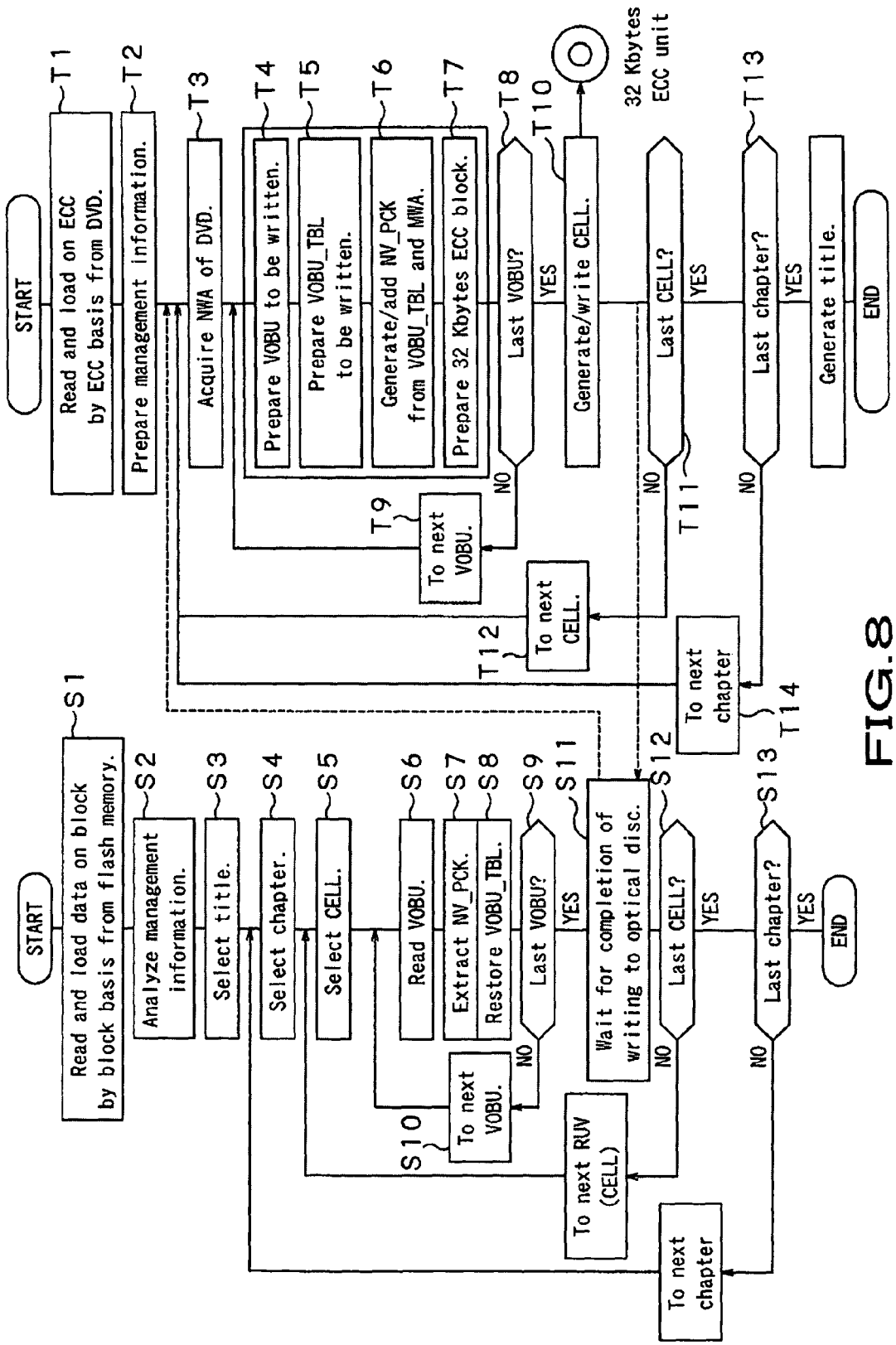
FIG. 8 is a flowchart of a copying process of copying data from a flash memory to a DVD.

The above-described copying process will be discussed further below by referring to FIGS. 8 and 9. FIG. 8 is a flowchart of a copying process, showing the sequence thereof. As a matter of fact, FIG. 8 shows two flowcharts in the left and right halves thereof. Roughly speaking, the left flowchart shows a process of reading a CELL from the flash memory 4 and the right flowchart shows a process of recording the CELL in the DVD.

Referring to FIG. 8, in Step S1, the flash buffer control section 23A reads out data from the flash memory 4 and loads them in the memory 24. In Step S2, the application format section 7 analyzes the file "*.IFO" containing management information of DVD Video out of the data loaded in the memory 24. Thereafter, the application format section 7 selects the title to be copied on the DVD in Step S3 and then the chapter to be copied on the DVD in Step S4 according to the file "*.IFO".

Then, in Step S5, the application format section 7 selects CELL to be copied. In Step S6, the flash file system section 22 reads out VOBU of the selected CELL from the flash memory 4 and loads it in the memory 24. The reading unit at this time is equal to the recording unit of the flash memory 4, or 64 Kbytes.

The application format section 7 extracts NV_PCK of VOBU in Step S7 and restores VOBU_TBL from the extracted NV_PCK in Step S8. In Step S9, the management information switching section 8 determines if the VOBU read out in Step S6 is the last VOBU of the CELL or not and, if it is the last VOBU (Step S9; YES), it waits for a write completion signal from the DVD drive 5 in Step S10. If, on the other hand, it is determined in Step S9 that the VOBU is not the last VOBU (Step S9; NO), the flash file system section 22 reads out the next VOBU from the selected CELL in Step S10.

Meanwhile, as a write completion signal is input in Step S11, the operation moves to the recording process illustrated at the right side of FIG. 8. The recording process will be described in greater detail hereinafter.

As the CELL is recorded, the management information switching section 8 receives a write completion signal from the DVD drive 5 in Step S11. As it receives a write completion signal as input, the management information switching section 8 determines if the recorded CELL is the last CELL or not in Step S12. If it is determined that the recorded CELL is not the last CELL (Step S12; NO), the flash file system reads out the next CELL of the selected chapter in Step S13.

If, on the other hand, it is determined that the CELL is the last CELL of the selected chapter (Step S12; YES), the management information switching section 8 determines if the selected chapter is the last chapter of the selected title or not in Step S14. If the selected chapter is not the last chapter of the selected title (Step S14; NO), the next chapter is read out in Step S15.

If, on the other hand, the selected chapter is the last chapter of the selected title (Step S14; YES), the management information switching section 8 ends the process of reading data from the flash memory 4.

Now, the flowchart at the right side of FIG. 8 will be described below. In Step T1, the DVD drive control section 21 reads out the management information of the DVD and loads it in the memory 24. In Step T2, the application format section 7 prepares VOBU_TBL that is the management information of DVDVideo on the memory 24.

In Step T3, the management information switching section 8 acquires the new writing address NWA of the DVD. The management information switching section 8 prepares VOBU to be written in Step T4 and then VOBU_TBL to be written in Step T5.

Figure 9:
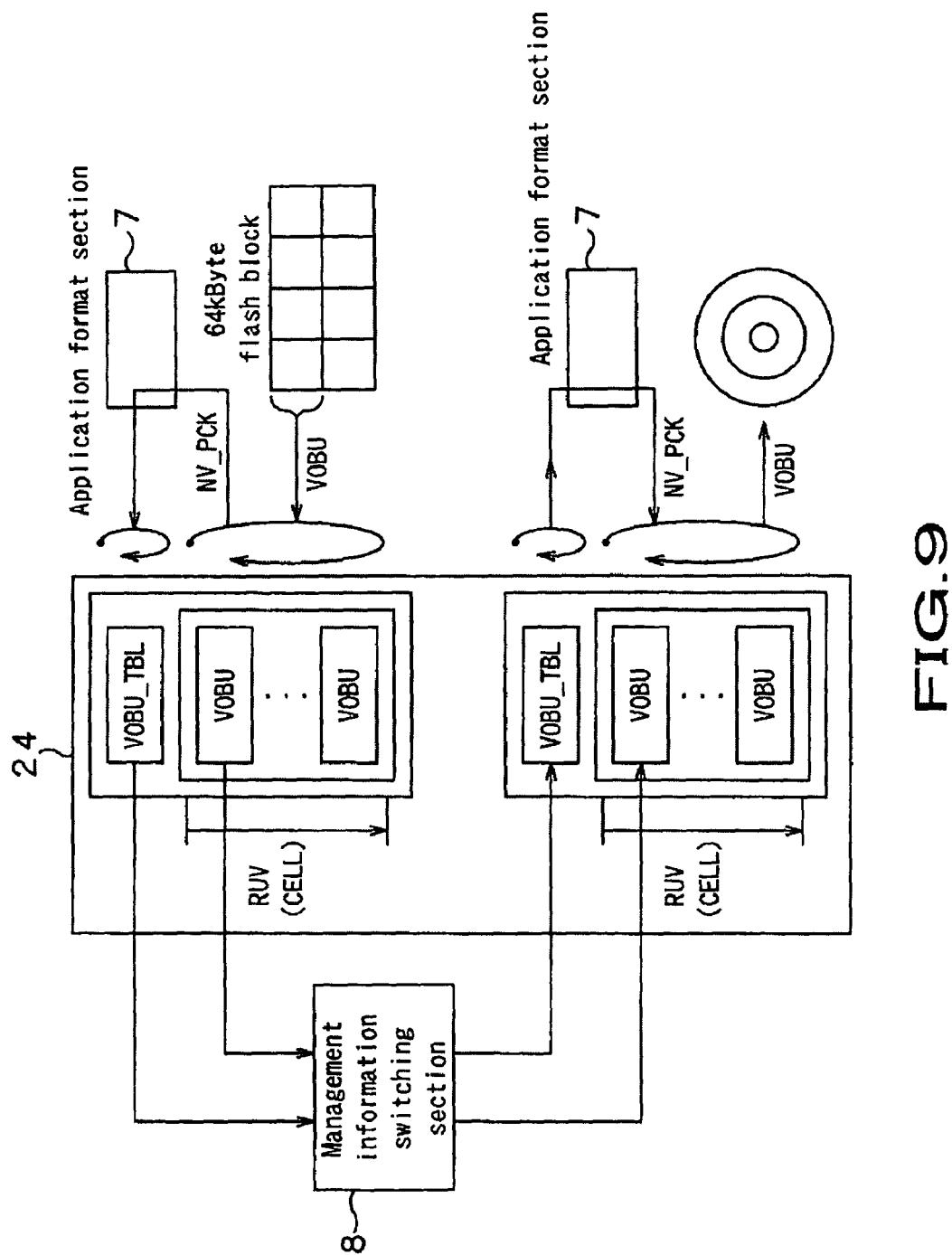
FIG. 9 is a schematic conceptual illustration showing how a memory may appear in a copying process.

FIG. 9 illustrates how the memory 24 may appear at this time. At this time, the memory 24 contains VOBU read out from the flash memory 4 and VOBU to be written on the DVD. Additionally, the memory 24 contains VOBU_TBL prepared from VOBU that is read out from the flash memory 4 and VOBU_TBL to be written. The management information switching section 8 prepares NV_PCK according to the NWA and VOBU_TBL to be written in Step T6 and affixes the NV_PCK to VOBU to be written.

In Step T7, The DVD buffer control section 23B generates an ECC block, combining VOBUs to be written. If the combined VOBUs to be written are short of 32 Kbytes, a padding packet is added to the tail end of the ECC block.

Then, in Step T8, the management information switching section 8 determines if the CELL is the last VOBU or not and, if it is not the last VOBU (Step T8; NO), it selects the next VOBU to be written as a processing target in Step T9 before it moves to Step T4.

If, on the other hand, the CELL is the last VOBU (Step T8; YES), the DVD drive control section 21 outputs the complete CELL to the DVD drive 5 in Step T10. The DVD drive 5 writes the input ECC block on the DVD.

In Step T11, the management information switching section 8 determines if the recorded CELL is the last CELL of the chapter or not. If it is determined that the CELL is not the last CELL of the chapter (Step T11; NO), the management information switching section 8 selects the next CELL as a processing target and moves to Step T3.

If, on the other hand, it is determined that the CELL is the last CELL of the chapter (Step T11; YES), the management information switching section 8 determines in Step T13 if the current chapter is the last chapter of the title or not. If the current chapter is not the last chapter of the title (Step T13; NO), the management information switching section 8 selects the next chapter as a processing target and moves to Step T2. If, on the other hand, the current chapter is the last chapter of the title (Step T15: YES), the management information switching section 8 generates a title in Step T14. For generating a title, the application format section 7 generates a PCG (program chain) in VTS_TBL. The VTS_TBL records information on the address positions of the CELLs recorded in the logical block of the DVD.

In the second embodiment of the present invention, a system of transferring the data written on the flash memory 4 to an optical disc of the holographic recording system that can be a disc with a recording density equal to eight times of the recording density of an ordinary DVD. A disc of the holographic recording system has a capacity of 200 GB to 1 TB, which is forty times to two hundreds times of the capacity of an ordinary DVD, which is 4.7 GB and the recording density is eight times of the recording density of a DVD. Such a disc is referred to as 8-times density disc hereinafter. Since a disc of the holographic recording system has a large capacity and handles a large volume of data, it is necessary to write page data with a recording unit that is a large set of data far larger than an ECC block of a DVD in terms of both physical recording and error correcting signal processing. In this embodiment, an 8-times density disc that uses a recording unit eight times as dense as that of an ECC of a DVD is used. More specifically, an 8-times density disc is adapted to form page data of a recording signal error correction unit of 256 Kbytes that is eight times of 32 Kbytes of an ECC, or an error correction unit of a DVD.

Figure 10:
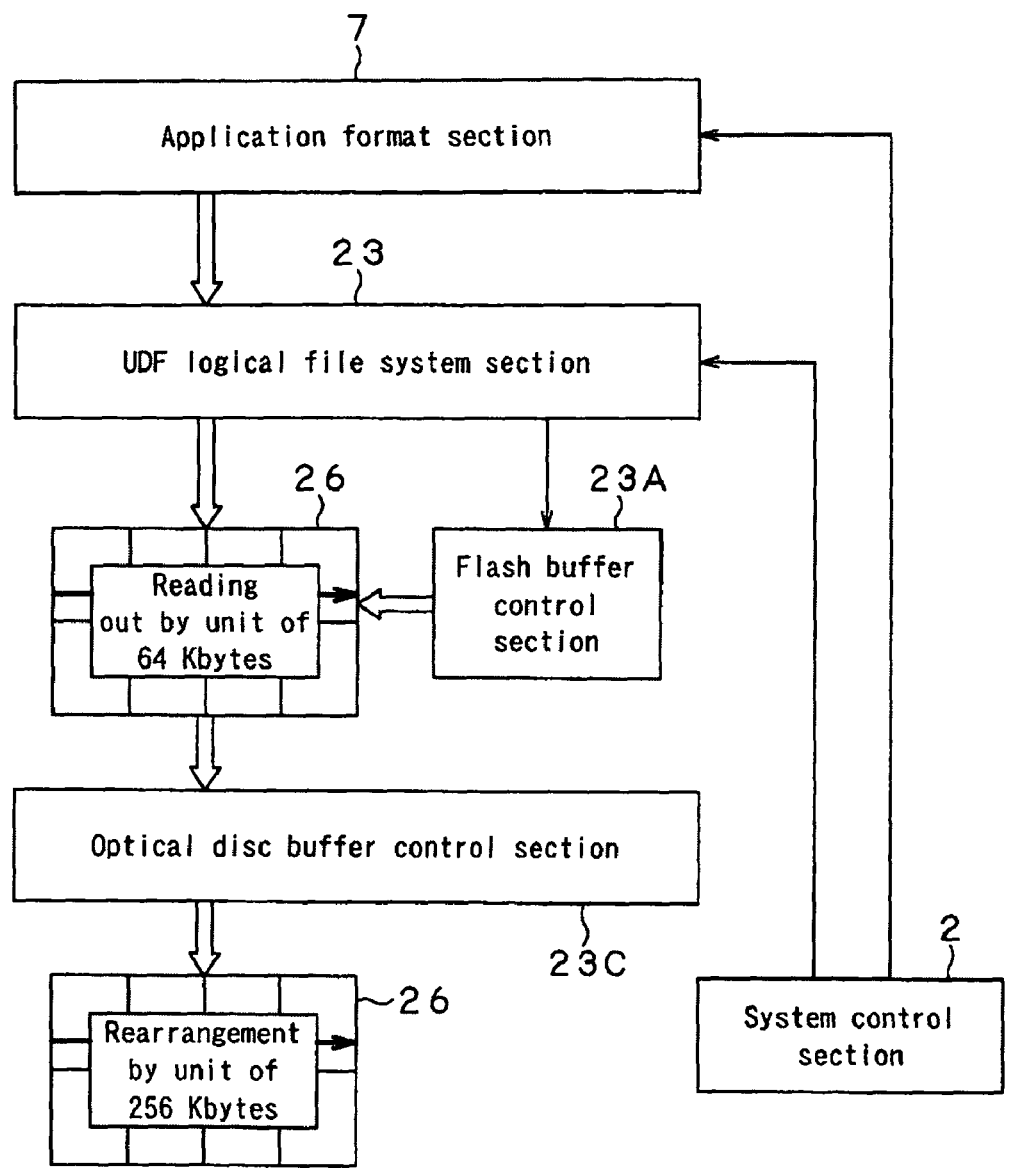
FIG. 10 is a schematic conceptual illustration of buffer control when recording data on an optical disc of a density of n times of 2.

Then, as shown in FIG. 10, the optical disc buffer control section 23C switches the recording unit to a size that is eight times of the size of an ECC of a DVD, or 32 Kbytes by means of recording unit buffer control processing function section that is a processing function section of the UDF (universal disc format) file system and forms page data with a recording unit of 256 Kbytes, that is four times of a recording unit of the flash memory 4, or 64 Kbytes. Thus, it records the page data on a 8-times density optical disc.

Now, the third embodiment of the present invention will be described below. For recording data in the flash memory, the recording control apparatus 1 resets the clock time information SCR of MPEG each time when it starts recording data.

When copying the data recorded in the flash memory on a DVD, the data are reproduced continuously if an SCR reset occurs if the application format of DVD is the DVDVideo format or the DVDVideo Recording format. On the other hand, a pause (a temporary soundless period) takes place when an SCR reset occurs if the application format of DVD is the DVD+RW Recording format.

Figure 11:
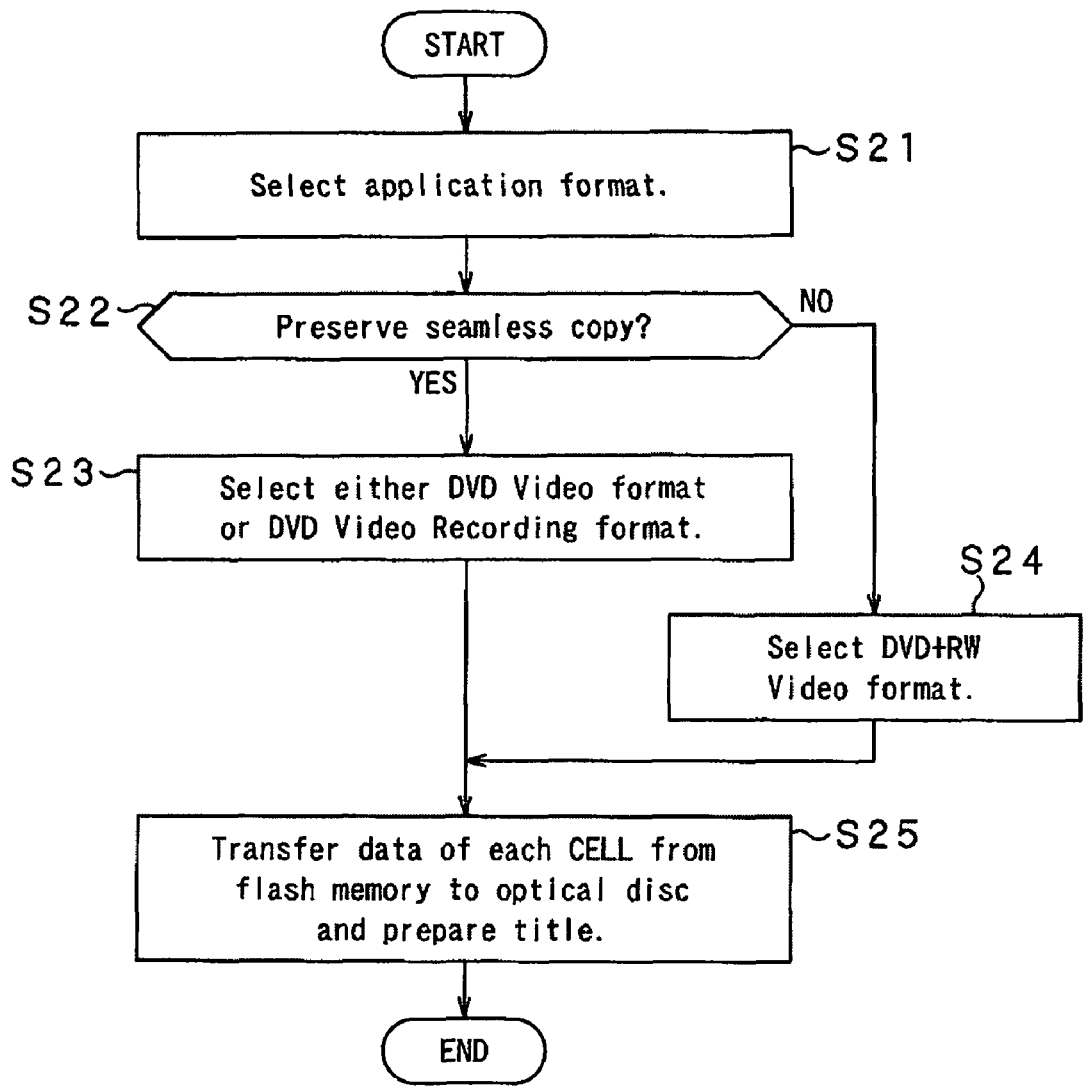
FIG. 11 is a flowchart of the operation of the third embodiment of recording control apparatus.

The recording control apparatus 1 of the third embodiment has a functional feature of causing the user to select the application format of DVD. FIG. 11 is a flowchart of the operation of the third embodiment of recording control apparatus 1. Referring to FIG. 11, the recording control apparatus 1 firstly causes the user to select a desired application format (Step S21) and, if the user specifies continuous reproduction (Step S22; YES), it converts the format of the data recorded in the flash memory into the DVDVideo format or the DVD-Video Recording format with which the data recorded in the flash memory are reproduced continuously if an SCR reset occurs each time when an image pickup operation starts (Step S23). If, on the other hand, the user specifies discontinuous reproduction (Step S22; NO), the recording control apparatus 1 converts the format of the data recorded in the flash memory into the DVD+RW Recording format with which a pause takes place when an SCR reset occurs (Step S24). Then, the recording control apparatus 1 transfers the data whose format has been converted to a predetermined application format from the flash memory to the optical disc on a CELL by CELL basis and prepares the title of the data (Step S25).

Figure 12:
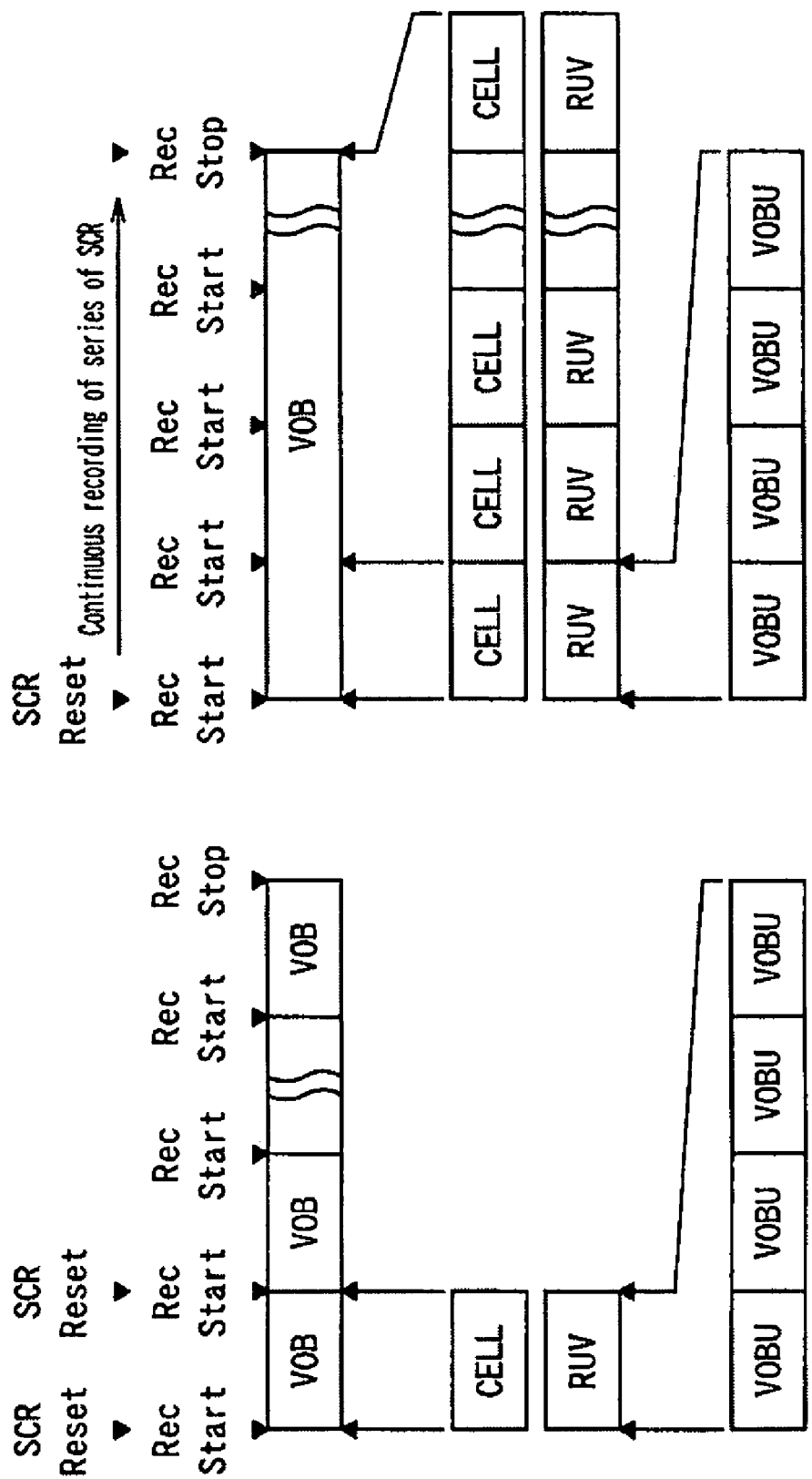
FIGS. 12A and 12B are schematic conceptual illustrations showing the difference of data structure between application formats.

FIGS. 12A and 12B are schematic conceptual illustrations showing the difference of data structure between application formats. FIG. 12A shows the data structure of the DVD Video format or the DVD Video Recording format. In either of these application formats, VOB is prepared when an SCR reset exists in the flash memory. With the DVD Video format and the DVD Video Recording format, data are recorded and stored on an optical disc as data of a seamless (temporarily continuous) recording title where no time is allowed to produce a pause among a plurality of streams of moving images picked up between the start and the end of an image pickup session.

FIG. 12B shows the data structure of the DVD+RW Video format. With this application format, the SCR is recorded continuously until the end of recording if an SCR reset exists in the flash memory. Thus, when the DVD+RW Video format is selected, data are recorded and stored on an optical disc with a non-seamless (temporarily discontinuous) recording title so that time of a pause exists without fail in the streams of moving images picked up between the start and the end of an image pickup session.

With the above-described selection, it is possible to select recording the set of CELL data picked up between the start and the end of image pickup sessions of a title and integrated by a continuous seamless picture title.

As described above, with the recording control apparatus 1 according to the embodiment of the present invention, a UDF file system and a file system for a DVD application are configured on the file system of the flash memory 4 so as to improve the affinity between the flash memory 4 and the DVD.

With the recording control apparatus 1 according to the embodiment of the present invention, it is possible to prepare data to be recorded on a DVD by converting the recording address information on the flash memory 4 into recording address information on the DVD and packetizing the data obtained as a result of the conversion into ECC blocks, which is a recording unit of DVD. Then, as a result, data are transferred from the flash memory 4 to the DVD at high speed.

For the purpose of generating a reproduction stream file group and reading/writing data, the recording control apparatus 1 according to the embodiment of the present invention generates a reproduction stream file group of at least a set of stream data (a CELL of a set of VOBUs) that is a reproduction access minimum unit conforming to the standard of optical discs to improve the efficiency of writing/reading data, making it match the recording unit of any recording medium. Thus, when generating a management information file group, the amount of data to be processed and the time necessary for processing data are far smaller than those for generating a reproduction stream file group even if it is necessary to change the standard for management information file groups for an optical disc so as to make it compatible with the medium to be used for writing data. Therefore, a management information file group can be generated so as to make it contain NWA information of the medium to be used for writing data as described above for the first through third embodiments.

While the operation of transferring DVD Video data from the flash memory 4 to a DVD is described above in detail for each of the first through third embodiments, it is equally possible to prepare DVD Audio data or moving image HD data to be recorded on a DVD simply by converting the address information and the recording unit. The present invention is applicable to recording mediums other than DVDs.

Figure 13:
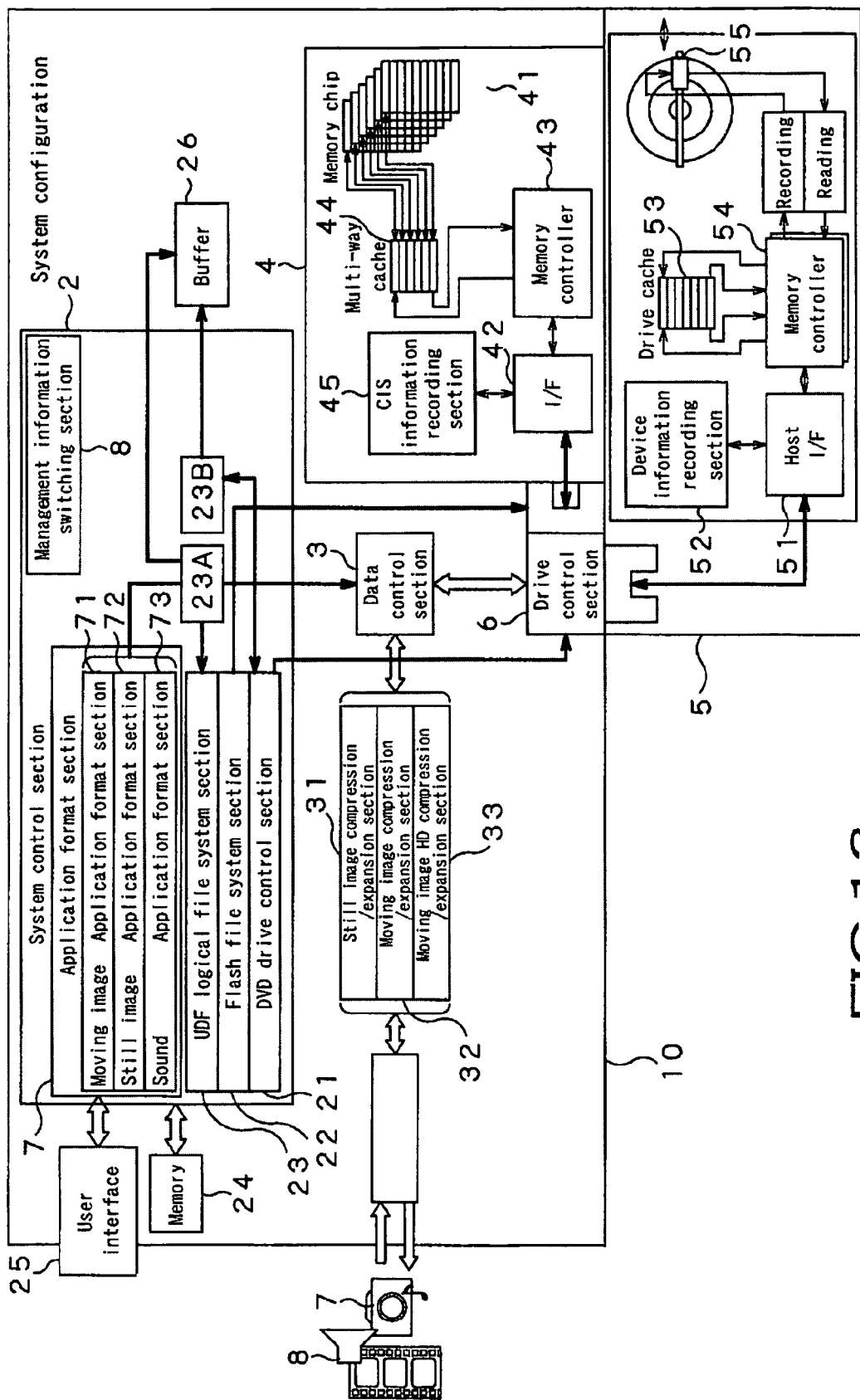
FIG. 13 is a schematic block diagram showing a configuration of recording control apparatus integral with a camera.

Now, a recording control apparatus 10 integral with a camera according to the embodiment of the present invention will be described below by referring to FIG. 13. As shown in FIG. 13, a recording control apparatus 10 integral with a camera includes a camera 7 for picking up moving images and still images, a microphone 8 for collecting sounds, a still image compression section 31 for compressing still images, a moving image compression section 32 for compressing moving images and a moving image HD compression section 33 for moving images HD (high density).

The system control section of the recording control apparatus 10 integral with a camera has a configuration same as the recording control apparatus of FIG. 1. Therefore, the components thereof are denoted respectively by the same reference symbols and will not be described any further.

The recording control apparatus 10 integral with a camera contains a flash memory 4. The DVD drive 5 is externally fitted to the apparatus 10. Thus, the recording control apparatus 10 integral with a camera utilizes the flash memory 4 as recording medium in shooting operations and a DVD as recording medium for storing data.

The recording control apparatus 10 integral with a camera records the data of a picked up image in the flash memory 4 by means of a file system that is same as that of the DVD to improve the efficiency of transferring data from the flash memory to the DVD.

Particularly, when writing moving image stream data that has to be provided with continuity and a high speed data writing performance in the flash memory, the apparatus 10 writes the data, using a flash block unit size that is larger than the unit size for ECC of optical discs, to eliminate the spare processing load for write blocks that are redundant when writing stream data continuously. Thus, it is possible to write data efficiently at high speed.

When recording data in the flash memory, the apparatus 10 accumulates stream data in the memory and, at the same time, collects garbage from the erase block to be used next for writing data so that no operation delay takes place due to the time necessary for the garbage collecting operation.

Additionally, since the apparatus 10 records data in the flash memory with an application format that is same as the application of the DVD, no processing operation is necessary to re-encode stream data when copying data from the flash memory to the DVD.

It should be understood by those skilled in the art that various modifications, combinations, sub-combinations and alterations may occur depending on design requirements and other factors insofar as they are within the scope of the appended claims or the equivalents thereof.

The invention claimed is:

1. A recording control apparatus, comprising:
a non-volatile memory file system section that manages addresses of a rewritable non-volatile memory and erases unnecessary data remaining in the rewritable non-volatile memory;
an optical disc file system section that configures a file system for an optical disc;
an application format section that generates a file group containing a set of video stream data of at least a reproduction access minimum unit conforming to the application format of optical discs on the optical disc file system;
a buffer that temporarily stores data;
a non-volatile memory buffer control section that converts a file group stored in the buffer into recording units of rewritable non-volatile memory, each recording unit of rewritable non-volatile memory being the size of an erase block of the rewritable non-volatile memory;
a recording control section that causes the file group converted into the recording units of rewritable non-volatile memory to be recorded in a data recording region of the non-volatile memory;
a drive control section that controls an optical disc drive;
a management information switching section that generates a file group to be recorded on the optical disc by switching file management information stored in the file group to file management information for the optical disc according to a new writing address acquired by the drive control section and the file management information stored in the file group; and
an optical disc buffer control section that converts the file group stored in the buffer into recording units of the optical disc so as to be recorded on the optical disc
wherein the optical disc buffer control section includes a multiple density buffer control section that converts the recording unit of the optical disc into a recording unit of n times 2 so as to match the recording unit of a multiple density optical disc when recording on a multiple density optical disc having a recording density of n times 2, and the management information switching section generates a file group to be recorded on an optical disc having a recording density of n times 2 by switching the file management information to file management information for an optical disc having a recording density of n times 2.

2. The apparatus according to claim 1, wherein the rewritable non-volatile memory is a flash memory.

3. The apparatus according to claim 1, wherein the non-volatile memory buffer control section makes the recording units of rewritable non-volatile memory have a data size equal to an integer times a recording unit of the optical disc.

4. The apparatus according to claim 1, further comprising:
an optical disc standard recording method selection section that selects either
a standard recording method of optical discs with which the set of video stream data conforming to the standard of the optical disc resets clock time information (SCR) annexed to each recording pack data at the end of recording the video stream data when writing data in the rewritable non-volatile memory, or
the standard recording method of optical discs with which recording clock time information (SCR) of the video stream data immediately succeeds the recording clock time information (SCR) of the video stream data at the end of the last recording session of recording video stream data as annexed to each recording pack data,
prior to the start of recording when generating the set of video stream data.

5. The apparatus according to claim 1, further comprising:
a system control section that causes data accumulation in a data accumulation section and erasure of unnecessary data of the non-volatile memory by the non-volatile memory file system section to take place concurrently at a predetermined sequence and timing.

* * * * *